United States Patent
Oono et al.

(10) Patent No.: US 8,029,370 B2
(45) Date of Patent: Oct. 4, 2011

(54) SPRING SEAT AND DAMPER DISK ASSEMBLY

(75) Inventors: Akihiko Oono, Yokohama (JP); Souichi Asai, Sagamihara (JP); Michitomo Masaki, Osaka (JP); Takashi Harada, Osaka (JP)

(73) Assignee: Exedy Corporation, Osaka (JP)

( * ) Notice: Subject to any disclaimer, the term of this patent is extended or adjusted under 35 U.S.C. 154(b) by 729 days.

(21) Appl. No.: 12/057,920

(22) Filed: Mar. 28, 2008

(65) Prior Publication Data

US 2008/0237950 A1 Oct. 2, 2008

(30) Foreign Application Priority Data

Mar. 30, 2007 (JP) .................................. 2007-090389

(51) Int. Cl.
*F16F 15/121* (2006.01)
(52) U.S. Cl. ..................................................... 464/68.92
(58) Field of Classification Search .................. 464/68.9, 464/68.92; 267/179, 170, 220, 221; 192/205, 192/213; 277/569; 264/279; 248/560, 562, 248/565, 603, 618
See application file for complete search history.

(56) References Cited

U.S. PATENT DOCUMENTS

| | | | | | |
|---|---|---|---|---|---|
| 2,321,941 | A | * | 6/1943 | Rose | 464/68.92 |
| 2,674,863 | A | * | 4/1954 | Thelander | 464/68.92 |
| 3,138,039 | A | * | 6/1964 | Zeidler et al. | 74/570.21 |
| 4,226,550 | A | * | 10/1980 | Kupcak et al. | |
| 4,798,370 | A | * | 1/1989 | Inuzuka | 267/220 |
| 5,676,355 | A | * | 10/1997 | Hayashi et al. | 267/221 |
| 6,186,558 | B1 | * | 2/2001 | Komolrochanaporn | |
| 6,645,079 | B2 | * | 11/2003 | Yoshimura | 464/68.92 |
| 6,682,431 | B2 | * | 1/2004 | Uehara | 464/68.92 |
| 6,708,810 | B2 | * | 3/2004 | Uehara | 192/213.22 |
| 6,712,705 | B2 | * | 3/2004 | Uehara et al. | 464/68.92 |
| 7,111,558 | B2 | * | 9/2006 | Brede et al. | |
| 2002/0039926 | A1 | * | 4/2002 | Uehara | 464/68.92 |
| 2002/0094874 | A1 | | 7/2002 | Uehara et al. | |
| 2002/0173361 | A1 | * | 11/2002 | Uehara | 464/68.92 |
| 2004/0119218 | A1 | | 6/2004 | Imanaka et al. | |
| 2005/0070362 | A1 | | 3/2005 | Mende et al. | |

FOREIGN PATENT DOCUMENTS

| | | | |
|---|---|---|---|
| DE | 102 41 879 A1 | 4/2003 | |
| GB | 537049 | * 6/1941 | 464/68.92 |
| JP | 2001-90781 A | 4/2001 | |
| JP | 2001-248674 A | 9/2001 | |
| JP | 2002-106639 A | 4/2002 | |
| JP | 2004-183871 A | 7/2004 | |

OTHER PUBLICATIONS

Office Action of corresponding Japanese Application No. 2007-090389 dated Jun. 7, 2011.

* cited by examiner

*Primary Examiner* — Gregory Binda
*Assistant Examiner* — Josh Skroupa
(74) *Attorney, Agent, or Firm* — Global IP Counselors, LLP

(57) ABSTRACT

Second spring seats 62 each have a first support component 63, a second support component 64, and a reinforcing plate 66. The first support component 63 supports the ends of second coil spring 61*a* in the rotational direction. The second support component 64 extends in the rotational direction from the first support component 63 and supports the end of the second spring 61*a* in the radial direction. At least part of the reinforcing plate 66 is embedded in at least one of the first and second support components 63 and 64. The reinforcing plate 66 directly or indirectly supports the end of the second spring 61*a* along with the first and second support components 63 and 64.

10 Claims, 9 Drawing Sheets

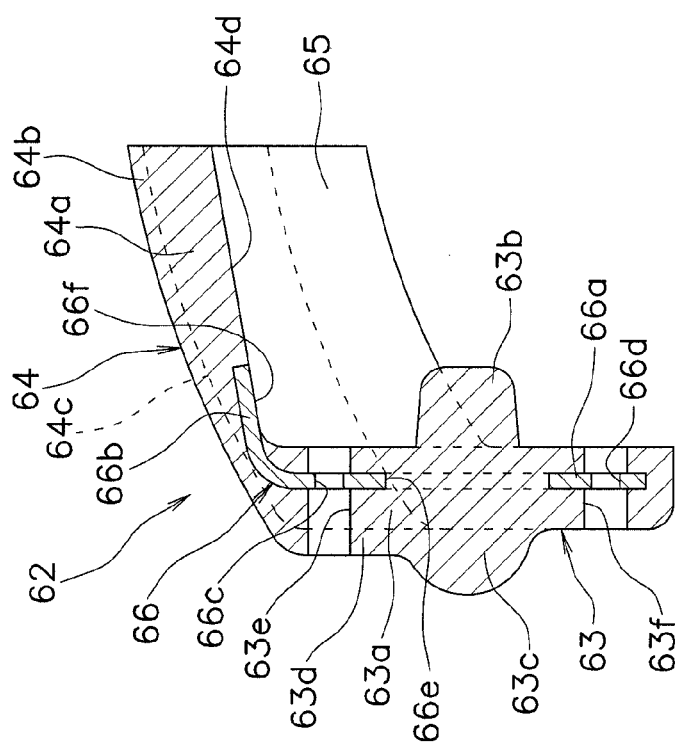
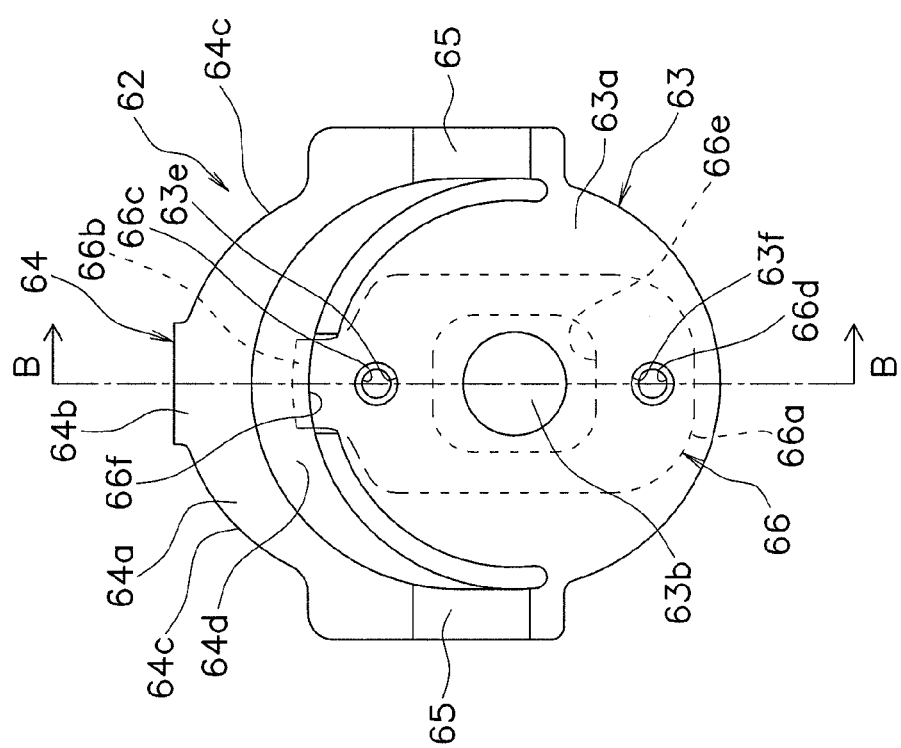
Fig. 7B
Fig. 7A

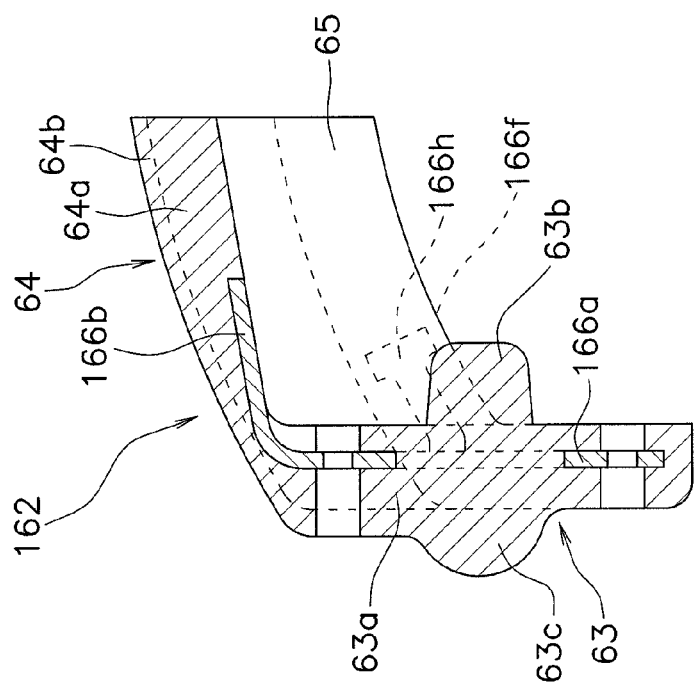
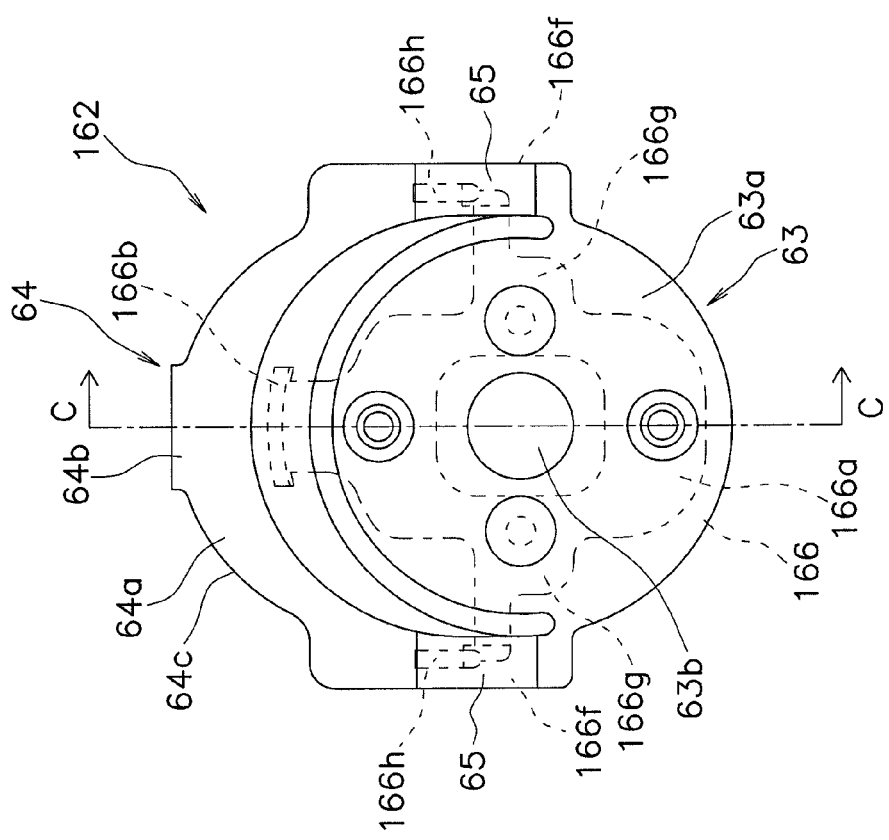
Fig. 8B
Fig. 8A

SPRING SEAT AND DAMPER DISK ASSEMBLY

CROSS-REFERENCE TO RELATED APPLICATIONS

This application claims priority to Japanese Patent Application No. 2007-090389 filed on Mar. 30, 2007. The entire disclosure of Japanese Patent Application No. 2007-090389 is hereby incorporated herein by reference.

BACKGROUND OF THE INVENTION

1. Field of the Invention

The present invention relates to a spring seat and a damper disk assembly, and more particularly relates to a spring seat that supports a spring that absorbs and dampens torsional vibration.

2. Background Information

To transmit the power generated by an engine, a vehicle is equipped with power transmission devices such as a clutch disk assembly, a flywheel assembly, and a torque converter lock-up apparatus. These power transmission devices are provided with a damper disk assembly that absorbs and dampens torsional vibrations and the like.

This kind of damper disk assembly main includes an input rotor, an output rotor, and a plurality of coil springs. The coil springs are disposed in a window or windows formed in the output rotor. When the input and output rotors rotate relative to each other, the coil springs are compressed in the rotational direction between the two rotors, which causes the torsional vibration inputted to the input rotor to be absorbed and dampened.

However, since the coil springs are subjected to centrifugal force, when they are compressed they move to the outside in the radial direction. As a result, the coil springs slide over the support components, for example, and strong frictional resistance is generated between the coil springs and the input rotor. This frictional resistance diminishes the ability of the damper disk assembly to dampen torsional vibration.

In view of this, a pair of spring seats were mounted at the ends of the coil springs in a conventional damper disk assembly (see Japanese Laid-Open Patent Application 2004-183871, for example). The spring seats can be made from plastic, metal, or another material, for example.

The spring seat discussed in Japanese Laid-Open Patent Application 2004-183871 has a sliding component disposed on the outside of the coil springs in the radial direction. The sliding component supports the ends of the coil springs in the radial direction. This prevents the coil springs from sliding over the support component.

If a spring seat has relatively low stiffness, however, when the coil springs are subjected to a strong centrifugal force, the sliding component is subjected to a large load to the outside in the radial direction, and the sliding component elastically deforms to the outside in the radial direction. As a result, for example, the sliding component slides over the support component, and frictional resistance is generated between the spring seats and the input rotor. This frictional resistance can bring about a decrease in the ability of the damper disk assembly to dampen torsional vibration. That is, if the stiffness of the spring seats is low, there is the risk that the ability of the damper disk assembly to dampen torsional vibration will be diminished.

In view of the above, it will be apparent to those skilled in the art from this disclosure that there exists a need for an improved spring seat and damper disk assembly. This invention addresses this need in the art as well as other needs, which will become apparent to those skilled in the art from this disclosure.

SUMMARY OF THE INVENTION

It is an object of the present invention to raise the stiffness of a spring seat.

It is another object of the present invention to improve the ability of a damper disk assembly to dampen torsional vibration.

A spring seat according to a first aspect of the present invention is a member that supports a spring that absorbs and dampens torsional vibrations, and includes a plastic first support component, a plastic second support component, and a metal reinforcing plate. The first support component supports the end of the spring in the axial direction of the spring. The second support component extends in the axial direction from the first support component and supports the end of the spring in a first direction that is perpendicular to the axial direction. At least part of the reinforcing plate is embedded in the first and/or second support component. The reinforcing plate directly or indirectly supports the end of the spring along with the first and second support components.

With this spring seat, since at least part of the reinforcing plate is embedded in the first and/or second support component, the overall stiffness of the spring seat can be higher than with a conventional spring seat.

The phrase "the reinforcing plate is embedded in the first and second support components" here includes, for example, both a case in which the reinforcing plate is completely embedded in the first and second support component, and a case in which part of the first protruding component is exposed from the first and second support components. The phrase "the reinforcing plate directly supports the end of the spring" means that the reinforcing plate supports the end of the spring in a state of being in contact with that end. The phrase "the reinforcing plate indirectly supports the end of the spring" means that the reinforcing plate supports the end of the spring in a state of not being in contact with that end.

The term "axis" here means the grouping of center points of a spring wound in a coil shape, for example. "Axial direction" means the direction extending along the axis. For instance, in the case of a compression spring, the axial direction substantially coincides with the direction in which the spring is compressed.

A spring seat according to a second aspect of the present invention is the spring seat of the first aspect, wherein the reinforcing plate has a first portion and a second portion. The first portion supports the end of the spring in the axial direction. The second portion extends in the axial direction from the first portion and supports the end of the spring.

A spring seat according to a third aspect of the present invention is the spring seat of the second aspect, wherein the first portion is embedded in the first support component. At least part of the second portion is exposed from the second support component to be configured to contact the end of the spring.

A spring seat according to a fourth aspect of the present invention is the spring seat of the third aspect, further including at least one reinforcing component. The reinforcing component is formed integrally with the first and second support components to link the first and second support components, and extends in the first direction from the second support component.

A spring seat according to a fifth aspect of the present invention is the spring seat of the fourth aspect, wherein the reinforcing plate further has at least one third portion. The third portion extends in the axial direction from the first portion, and is embedded in the reinforcing component.

A spring seat according to a sixth aspect of the present invention is the spring seat according to any of the first to fifth inventions, wherein the first support component has a first support component main body and a first support protrusion. The first support component main body comes into contact with the end of the spring in the axial direction. The first support protrusion protrudes from the first support component main body to the spring side. The first support protrusion is fitted to the end of the spring or to the end of a small spring that is disposed on the inner peripheral side of the spring and has an outside diameter that is smaller than the inside diameter of the spring.

A damper disk assembly spring seat according to a seventh aspect of the present invention includes an input rotor, an output rotor, at least one spring, and a pair of the spring seats according to any of the first to sixth aspects. The output rotor is disposed rotatably with respect to the input rotor. The spring is disposed to be compressible in the rotational direction between the input and output rotors. The two spring seats are mounted at the ends of the spring.

Since this damper disk assembly has the spring seats according to any of the first to sixth inventions, the second support component undergoes less elastic deformation to the outside in the radial direction. As a result, there is less sliding between the spring seats and the input rotor, or between the spring seats and output rotor, and attenuation of torsional vibration can be enhanced.

The rotational direction of the input and output rotors substantially coincides with the axial direction of the spring. The radial direction of the input and output rotors substantially coincides with the first direction. The axial direction of the input and output rotors substantially coincides with the second direction.

EFFECT OF THE INVENTION

Stiffness can be increased with the spring seat pertaining to the present invention.

Better torsional vibration attenuation can be achieved with the damper disk assembly pertaining to the present invention.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 7A and 7B are an elevational view and a cross-sectional view of a second spring seat of the second spring assembly;

FIGS. 8A and 8B are an elevational view and a cross-sectional view of a second spring seat in accordance with an alternate embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Configuration of Damper Disk Assembly

Figure 1:
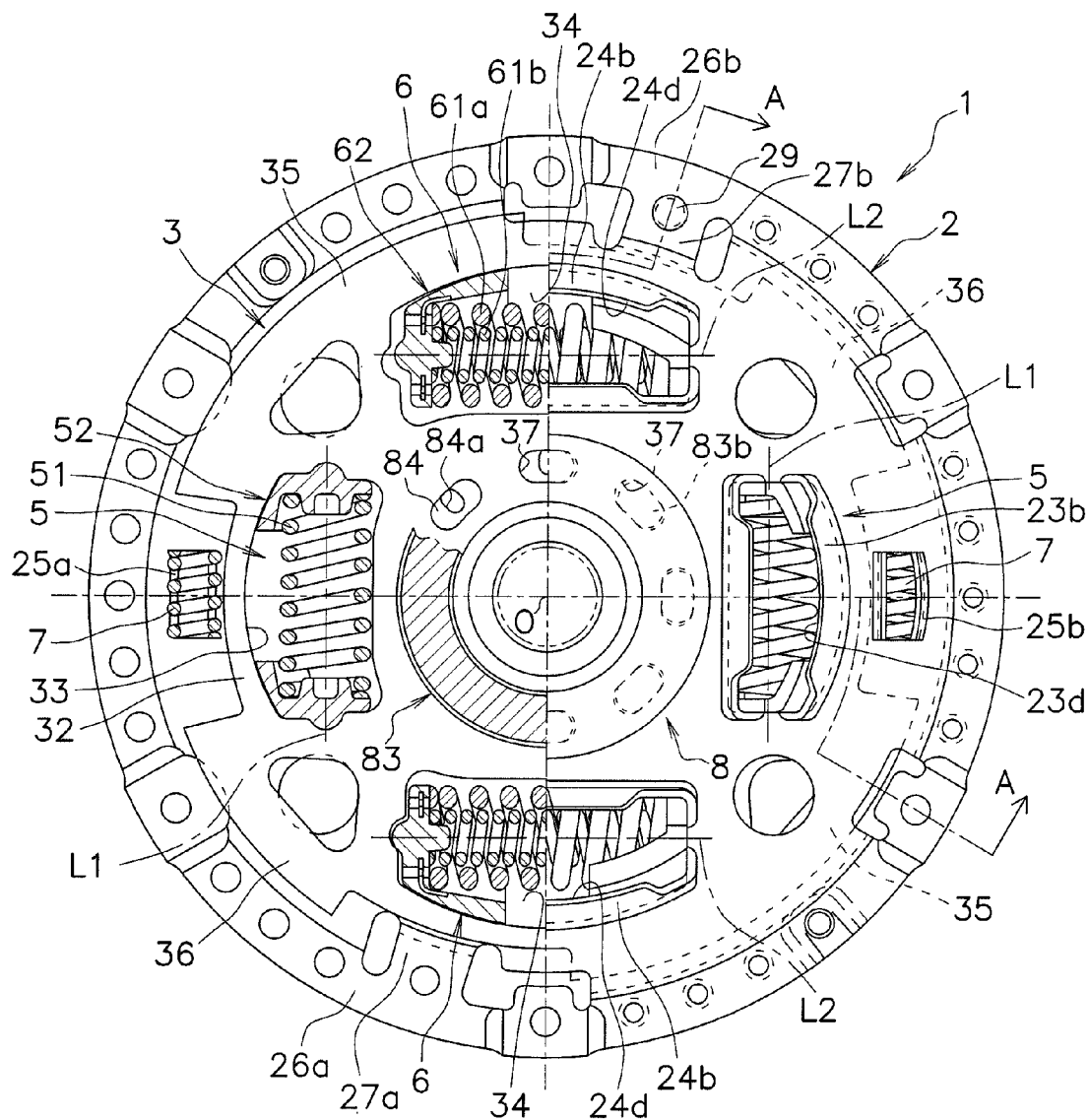
FIG. 1 is a simplified elevational view of a damper disk assembly according to a preferred embodiment of the present invention with sections removed for illustrative purposes.
Figure 2:
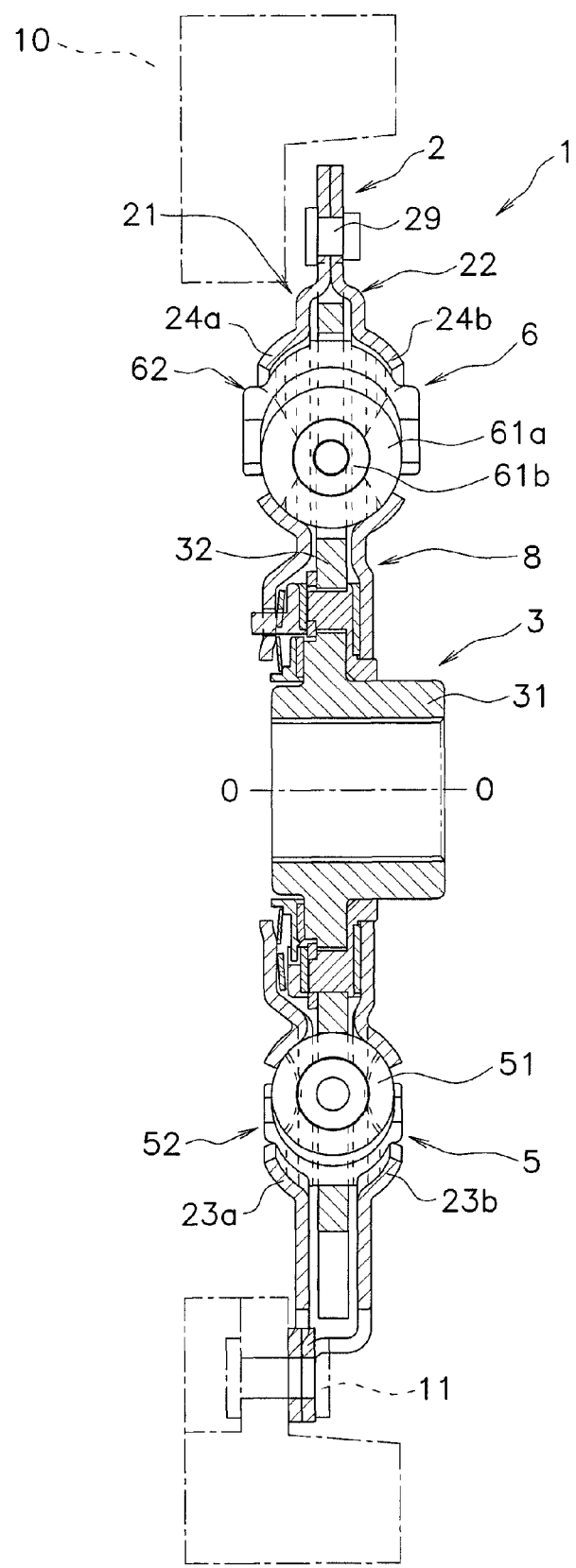
FIG. 2 is a simplified vertical cross-sectional view of the damper disk assembly taken along the line A-A in FIG. 1.
Figure 3:
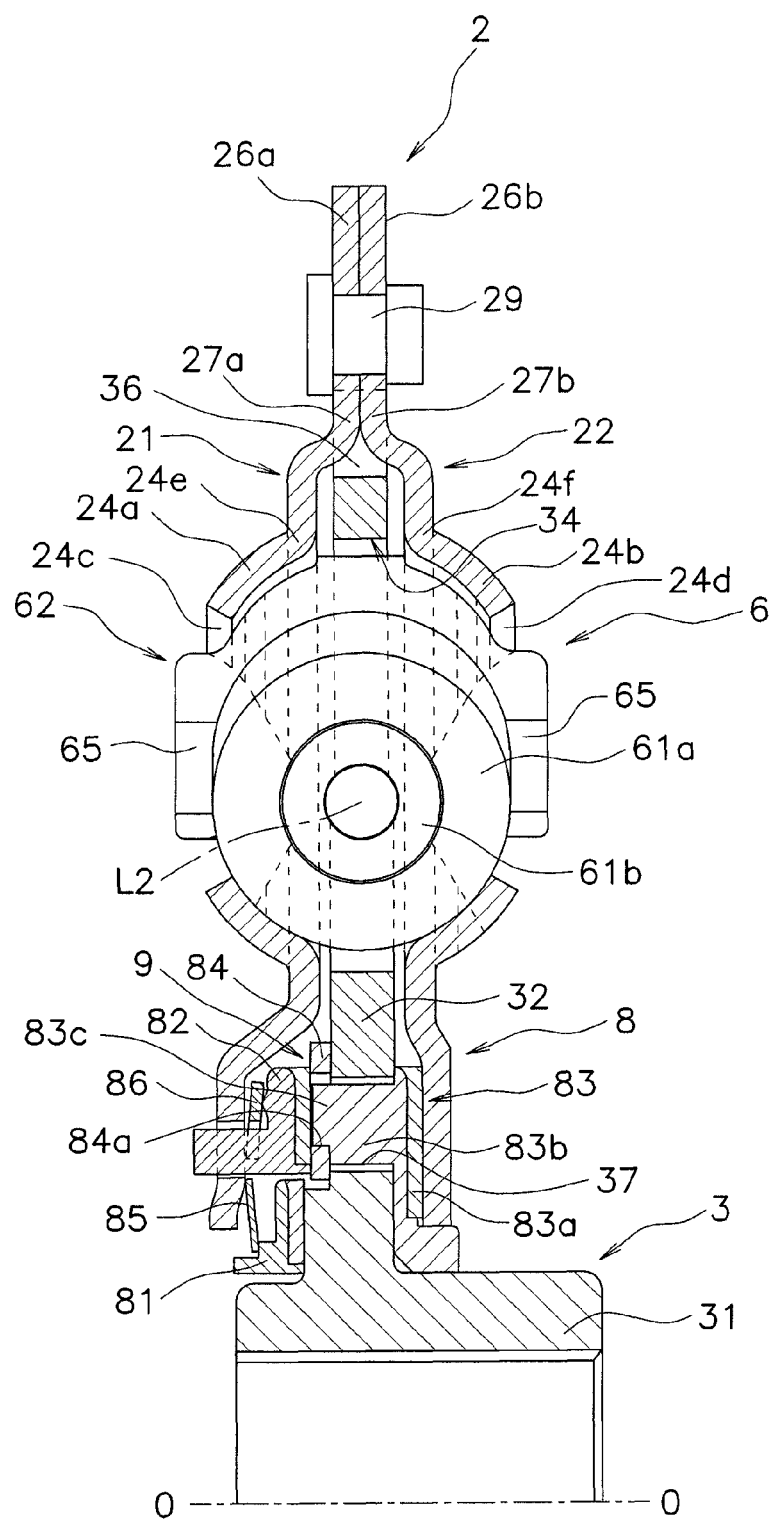
FIG. 3 is a partial cross-sectional view of the damper disk assembly.
Figure 4:
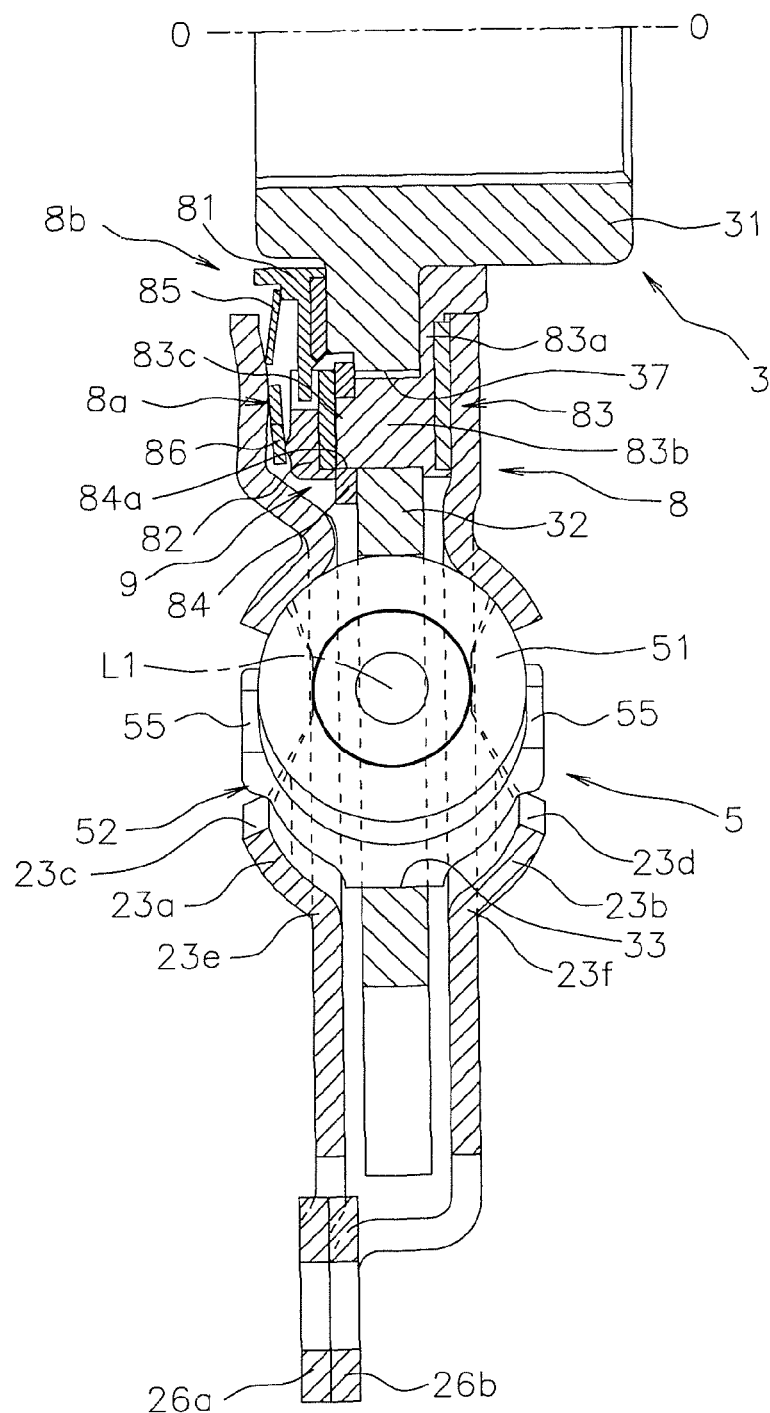
FIG. 4 is an alternate partial cross-sectional view of the damper disk assembly.

The configuration of the damper disk assembly 1 according to a preferred embodiment of the present invention will be described with reference to FIGS. 1 to 4. FIG. 1 is a simplified elevational view of the damper disk assembly 1. FIG. 2 is a simplified vertical cross-sectional view of the damper disk assembly 1 taken along the line A-A in FIG. 1. FIGS. 3 and 4 are partial cross-sectional views of the damper disk assembly 1. FIG. 1 shows a neutral state in which no torque is inputted to the damper disk assembly 1.

In the following description, the terms "rotational direction," "radial direction (first direction)," and "axial direction (second direction)" refer to the various directions of the damper disk assembly 1 unless otherwise specified.

The damper disk assembly 1 is a mechanism that transmits torque and also absorbs and attenuates torsional vibrations. As shown in FIG. 2, for example, the damper disk assembly 1 is fixed by rivets 11 to an annular flywheel 10. The flywheel 10 is a member that obtains a high inertia, and is fixed to a crankshaft (not shown) via a flexible plate (not shown). The flywheel 10 is provided on the input side of the damper disk assembly 1.

As shown in FIGS. 1 and 2, the damper disk assembly 1 mainly has an input plate 2 (serving as the input rotor), a hub 3 (serving as the output rotor), two first spring assemblies 5, two second spring assemblies 6, and two third coil springs 7. The first spring assemblies 5, the second spring assemblies 6, and the third coil springs 7 are compressed in parallel in the rotational direction between the input plate 2 and the hub 3.

As shown in FIG. 2, the input plate 2 has a first plate 21, and a second plate 22 disposed on the transmission side of the first plate 21. The first plate 21 and the second plate 22 are annular plate members, and are fixed to each other by rivets 29. The outer peripheral part of the input plate 2 is fixed by the rivets 11 to the flywheel 10.

The input plate 2 supports the first spring assemblies 5, the second spring assemblies 6, and the third coil springs 7 to be elastically deformable in the rotational direction. More specifically, as shown in FIGS. 1 to 4, the first plate 21 has two first support components 23a, two second support components 24a, and two third support components 25a. The second plate 22 has two first support components 23b, two second support components 24b, and two third support components 25b. The first spring assemblies 5 are supported by the first support components 23a and the first support components 23b. The second spring assemblies 6 are supported by the second support components 24a and the second support components 24b. The third coil springs 7 are supported by the third support components 25a and the third support components 25b.

The hub 3 is disposed rotatably with respect to the input plate 2, and is linked to an output shaft (not shown). More specifically, as shown in FIGS. 1 to 4, the hub 3 mainly has a cylindrical boss 31 and an annular flange 32 that extends outward in the radial direction from the boss 31.

The boss 31 is disposed on the inner peripheral side of first plate 21 and the second plate 22, and is engaged by a spline to an output shaft (not shown). The flange 32 is disposed in the axial direction between the first plate 21 and the second plate 22, and has two first windows 33, two second windows 34, two first protrusions 35, and two second protrusions 36.

The first spring assemblies 5 are disposed on the inside of the first windows 33. The length of the first windows 33 in the rotational direction is substantially the same as the length of the first support components 23a and 23b in the rotational direction, and is substantially the same as the free length of the first spring assemblies 5. This configuration determines the relative positions of the input plate 2 and the hub 3 in the rotational direction in a neutral state.

The second spring assemblies 6 are disposed on the inside of the second windows 34. The length of the second windows 34 in the rotational direction is greater than the length of the second support components 24a and 24b in the rotational direction, and is greater than the free length of the second spring assemblies 6. In a neutral state, a gap is ensured in the rotational direction between the second spring assemblies 6 and the edge of the second windows 34.

The first protrusions 35 are disposed a specific distance apart in the rotational direction between the two second protrusions 36. The third coil springs 7 and the third support components 25a and 25b are disposed in the rotational direction between the first protrusions 35 and the third coil springs 7. In a neutral state, a gap is ensured in the rotational direction between the first protrusions 35 and the third coil springs 7, and between the second protrusions 36 and the third coil springs 7.

When the input plate 2 rotates relative to the hub 3, the first spring assemblies 5, the second spring assemblies 6, and the third coil springs 7 begin to compress, in that order. This results in torsional characteristics in which the damper disk assembly 1 has three stages of torsional stiffness.

As shown in FIGS. 1 and 3, the first plate 21 further has an annular first outer peripheral part 26a, and a first protruding component 27a that extends to the inside in the radial direction from the first outer peripheral part 26a. The second plate 22 has an annular second outer peripheral part 26b, and a second protruding component 27b that extends to the inside in the radial direction from the second outer peripheral part 26b. The first protruding component 27a and the second protruding component 27b are fixed together by rivets 29 while in contact in the axial direction. The first protruding component 27a and the second protruding component 27b are able to come into contact with the first protrusions 35 and the second protrusions 36 in the rotational direction. This restricts the relative rotation of the input plate 2 and the hub 3 to a specific angular range.

Friction Generating Mechanism

The damper disk assembly 1 further has a friction generating mechanism 8 that generates hysteresis torque. The friction generating mechanism 8 is provided to act in parallel with the first spring assemblies 5, the second spring assemblies 6, and the third coil springs 7. More specifically, as shown in FIGS. 3 and 4, the friction generating mechanism 8 mainly has a first friction washer 81, a second friction washer 82, a third friction washer 83, a friction plate 84, a first cone spring 85, and a second cone spring 86.

The first friction washer 81 is an annular member that generates low hysteresis torque, and is disposed between the flange 32 and the first plate 21 in the rotational direction. The first cone spring 85 presses the first friction washer 81 against the inner peripheral part of the flange 32.

The second friction washer 82 is an annular member that generates high hysteresis torque, and is disposed on the outer peripheral side of the first friction washer 81. The second friction washer 82 is provided to rotate integrally with the first friction washer 81 and the first plate 21. That is, the first friction washer 81 and the second friction washer 82 rotate integrally with the input plate 2. The second cone spring 86 presses the second friction washer 82 against the friction plate 84.

The third friction washer 83 and the friction plate 84 are members that generate high hysteresis torque, and rotate integrally. The third friction washer 83 is an annular member disposed in the rotational direction between the flange 32 and the second plate 22, and is provided to rotate relative to the hub 3 within a specific angular range. More specifically, the third friction washer 83 has an annular main body 83a, and a plurality of stoppers 83b that protrude in the axial direction from the main body 83a. The stoppers 83b pass through a plurality of holes 37 formed in the flange 32. The holes 37 are roughly elliptical in shape, and are longer in the rotational direction. The cross sectional shape of the stoppers 83b is also roughly elliptical in shape, and longer in the rotational direction. A gap is ensured in the rotational direction between the stoppers 83b and the edges of the holes 37.

A distal end component 83c that has a smaller outside diameter than the stoppers 83b is formed on the engine side of the stoppers 83b. The distal end component 83c is inserted in a hole 84a formed in the friction plate 84. The distal end component 83c and the hole 84a are substantially the same size in the rotational direction. Therefore, the third friction washer 83 and the friction plate 84 rotate integrally.

The friction plate 84 is pushed to the transmission side by the second cone spring 86 via the second friction washer 82. The friction plate 84 is sandwiched between the second friction washer 82 and the stoppers 83b. A gap is ensured in the axial direction between the friction plate 84 and the flange 32. A gap is also ensured in the axial direction between the distal end component 83c and the second friction washer 82.

As discussed above, the second friction washer 82, the second cone spring 86, the third friction washer 83, and the friction plate 84 constitute a large friction generating mechanism 8a that generates high hysteresis torque. The hysteresis torque generated by a small friction generating mechanism 8b is considerably lower than the hysteresis torque generated by the large friction generating mechanism 8a.

Basically, the large friction generating mechanism 8a and the small friction generating mechanism 8b operate when the input plate 2 rotates relative to the hub 3. This allows torsional vibration to be effectively absorbed and dampened.

Also, as shown in FIG. 1, a gap is ensured in the rotational direction between the stoppers 83b and the holes 37. Therefore, within the torsion angle range corresponding to this gap, the third friction washer 83 and the friction plate 84 rotate integrally with the input plate 2 and the second friction washer 82. As a result, frictional resistance is generated between the first friction washer 81 and the hub 3. That is, the third friction washer 83, the friction plate 84, and the holes 37 constitute a friction suppressing mechanism 9 that suppresses the generation of high hysteresis torque within a specific angular range. This allows the tiny torsional vibrations caused by combustion fluctuations in the engine to be effectively absorbed and dampened.

Configuration of Spring Assemblies

Figure 5:
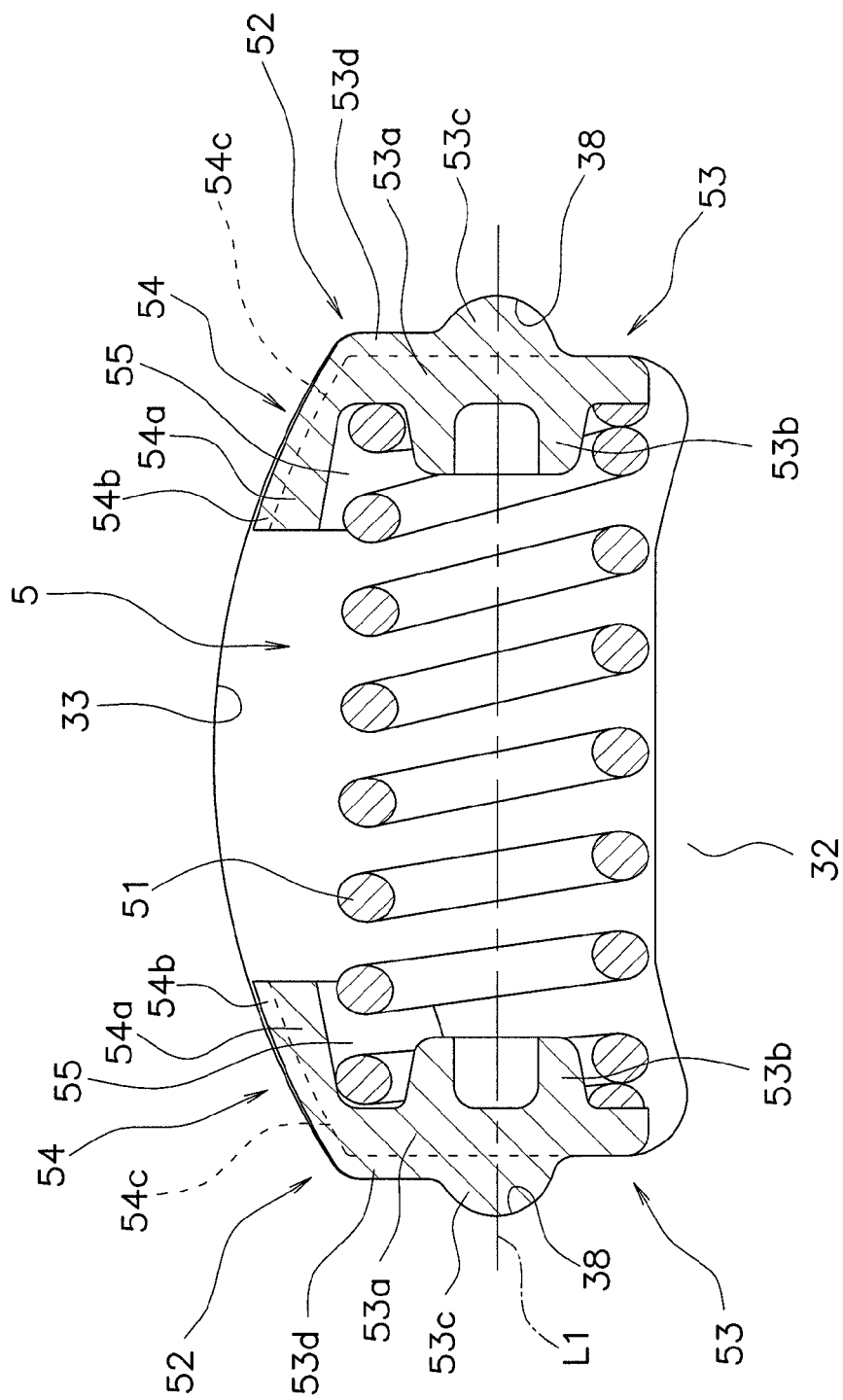
FIG. 5 is a cross-sectional view of a first spring assembly of the damper disk assembly.
Figure 6:
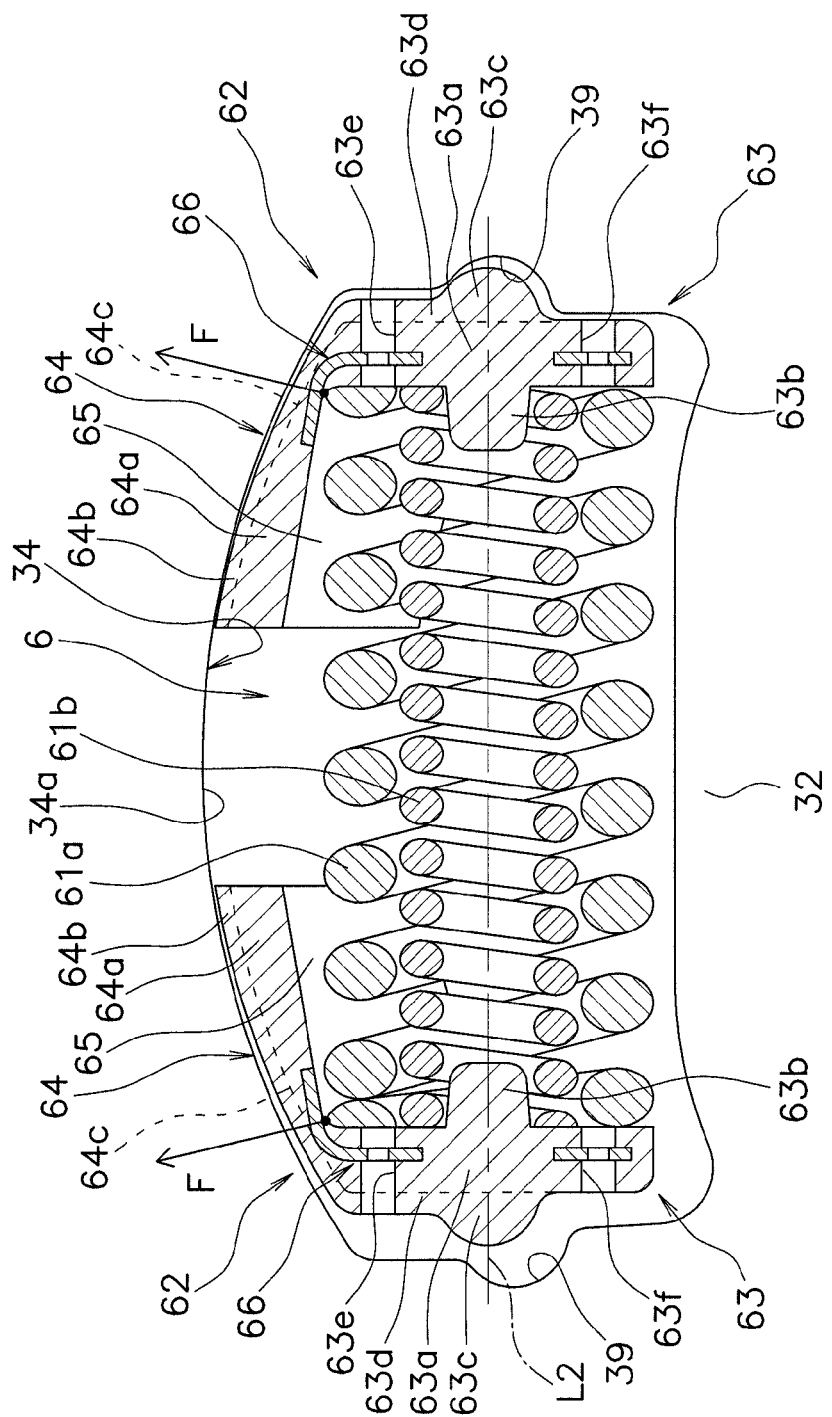
FIG. 6 is a cross-sectional view of a second spring assembly of the damper disk assembly.

The configuration of the first spring assemblies 5 and the second spring assemblies 6 will be described through reference to FIGS. 1 to 7B. FIG. 5 is a cross-sectional view of one of the first spring assemblies 5. FIG. 6 is a cross-sectional view of one of the second spring assemblies 6. FIGS. 7A and 7B are an elevational view and a cross-sectional view of the second spring seats 62 of the second spring assembly 6. The cross section in FIG. 7B is taken along the line B-B in the elevational view of FIG. 7A.

(1) First Spring Assemblies 5

As shown in FIG. 5, each first spring assembly 5 mainly has a first coil spring 51, and a pair of first spring seats 52 mounted at the ends of the first coil spring 51.

The first spring seats 52 are preferably plastic members, and each have a first support component 53 that supports an end of the first coil spring 51, a second support component 54 that is disposed to the outside of the first coil spring 51 in the radial direction, and a pair of reinforcing components 55 that extend to the inside in the radial direction from the second support component 54. The first spring seats 52 are integrally molded by injection molding or the like.

The first support components 53 each have a first support component main body 53a that is roughly disk shaped, a first support protrusion 53b that protrudes from the first support component main body 53a to the first coil spring 51 side, a second support protrusion 53c that protrudes to the opposite side from the first support protrusion 53b, and a protruding component 53d.

The first support protrusions 53b are fitted into the ends of the first coil spring 51, and support the ends of the first coil spring 51 in the radial direction and the axial direction. The second support protrusions 53c are portions that prevent the movement of the first spring seats 52 in the radial direction with respect to the flange 32, and are fitted into cutouts 38 in the first windows 33. The protruding components 53d are portions protruding from the first support component main bodies 53a in the rotational direction, and extend to the outside in the radial direction from the second support protrusions 53c.

The second support components 54 are portions covering the ends of the first coil spring 51, and each have a second support component main body 54a and a protruding component 54b. The second support component main bodies 54a extend in the rotational direction from the first support components 53. The cross sectional shape of the second support component main bodies 54a is that of an arc that conforms to the outer shape of the first coil spring 51. As shown in FIG. 4, when viewed in the rotational direction, the second support component main bodies 54a cover approximately one-fourth of the outer peripheral part of the first coil spring 51.

As seen in FIG. 5, the protruding components 54b protrude to the outside in the radial direction from the second support component main bodies 54a. The protruding components 54b extend in the rotational direction, and are integral with the protruding components 53d of the first support components 53. Put another way, the protruding components 53d link the protruding components 54b and the second support protrusions 53c.

A pair of sliding surfaces 54c is formed on the outside of the second support component main bodies 54a in the radial direction. Referring to FIGS. 4 and 5, the sliding surfaces 54c are disposed on both sides of the protruding components 54b in the axial direction, and come into contact with the first support components 23a and 23b. Therefore, the positioning of the first spring seats 52 in the radial direction and the axial direction is performed by the first support components 23a and 23b.

The second support protrusions 53c and the protruding components 54b and 53d are disposed between the first plate 21 and the second plate 22 in the axial direction (more specifically, between the base portions 23e and 23f of the first support components 23a and 23b in the axial direction). When the first spring seats 52 are pushed by the flange 32 and move in the rotational direction with respect to the input plate 2, the protruding components 54b move in the rotational direction between the base portions of the first support components 23a and 23b. That is, the second support protrusions 53c and the protruding components 54b and 53d prevent the first spring seats 52 from rotating around the axis L1 of the first coil spring 51. This stabilizes the operation of the first spring seats 52.

The reinforcing components 55 are formed integrally with the first support components 53 and the second support components 54 to link the first support components 53 and the second support components 54. The reinforcing components 55 are plate-shaped members extending in the radial direction, and extend in the rotational direction from the first support components 53 just as do the second support components 54. As shown in FIG. 5, the reinforcing components 55 extend in an arc shape in the rotational direction. A pair of reinforcing components 55 supports the ends of the first coil spring 51 in the axial direction. More precisely, the base portions of the reinforcing components 55 around the first support components 53 come into contact with the ends of the first coil spring 51 in the axial direction.

The reinforcing components 55 protrude from the second support components 54 to the opposite side from the first coil spring 51 in the axial direction. The reinforcing components 55 on the engine side are disposed in first openings 23c formed in the first support components 23a, and protrude more to the engine side than the first support components 23a. The reinforcing components 55 on the transmission side are disposed in first openings 23d formed in the first support components 23b, and protrude more to the transmission side than the first support components 23b.

The overall stiffness of the first spring seats 52 is increased by the reinforcing components 55. This suppresses the elastic deformation of the second support components 54 to the outside in the radial direction by centrifugal force.

(2) Second Spring Assemblies 6

As shown in FIGS. 6, 7A, and 7B, each second spring assembly 6 mainly has a second coil spring 61a, a fourth coil spring 61b, and a pair of second spring seats 62 mounted at the ends of the second coil spring 61a and the fourth coil spring 61b. The fourth coil springs 61b are disposed on the inner peripheral side of the second coil springs 61a. The outside diameter of the fourth coil springs 61b is smaller than the inside diameter of the second coil springs 61a.

The second spring seats 62 each have a first support component 63 that supports the ends of the second coil spring 61a and the fourth coil spring 61b, a second support component 64 that is disposed to the outside of the second coil spring 61a in the radial direction, a pair of reinforcing components 65 that extend to the inside in the radial direction from the second support component 64, and a reinforcing plate 66. The reinforcing plates 66 are preferably made of a material that is stiffer than the portion other than the reinforcing plates 66. For example, the reinforcing plates 66 are preferably made of metal, and the portion other than the reinforcing plates 66 is preferably made of plastic. The portion of the second spring seats 62 other than the reinforcing plates 66 is integrally formed by injection molding or the like.

The first support components 63 each have a first support component main body 63a that is roughly disk shaped, a first support protrusion 63b that protrudes from the first support component main body 63a to the second coil spring 61a side, a second support protrusion 63c that protrudes to the opposite side from the first support protrusion 63b, and a protruding component 63d.

The first support protrusions 63b are fitted into the ends of the fourth coil springs 61b, and support the ends of the fourth coil springs 61b in the radial direction and the axial direction. The second support protrusions 63c are portions that prevent the movement of the second spring seats 62 in the radial direction with respect to the flange 32, and are fitted into cutouts 39 in the second windows 34. The protruding components 63d are portions protruding from the first support component main bodies 63a in the rotational direction, and extend to the outside in the radial direction from the second support protrusions 63c.

The second support components 64 are portions covering the ends of the second coil springs 61a, and each have a second support component main body 64a and a protruding component 64b. The second support component main bodies 64a extend in the rotational direction from the first support components 63. The cross sectional shape of the second support component main bodies 64a is that of an arc that conforms to the outer shape of the second coil spring 61a. As shown in FIG. 3, when viewed in the rotational direction, the second support component main bodies 64a cover approximately one-fourth of the outer peripheral part of the second coil spring 61a.

As seen in FIGS. 6, 7A, and 7B, the protruding components 64b protrude to the outside in the radial direction from the second support component main bodies 64a. The protruding components 64b extend in the rotational direction, and are integral with the protruding components 63d of the first support components 63. Put another way, the protruding components 63d link the protruding components 64b and the second support protrusions 63c.

A pair of sliding surfaces 64c is formed on the outside of the second support component main bodies 64a in the radial direction. The sliding surfaces 64c are disposed on both sides of the protruding components 64b in the axial direction, and come into contact with the second support components 24a and 24b. Therefore, the positioning of the second spring seats 62 in the radial direction and the axial direction is performed by the second support components 24a and 24b.

The second support protrusions 63c and the protruding components 64b and 63d are disposed between the first plate 21 and the second plate 22 in the axial direction (more specifically, between the base portions 24e and 24f of the second support components 24a and 24b in the axial direction). When the second spring seats 62 are pushed by the flange 32 and move in the rotational direction with respect to the input plate 2, the protruding components 64b move in the rotational direction between the base portions of the second support components 24a and 24b. That is, the second support protrusions 63c and the protruding components 64b and 63d prevent the second spring seats 62 from rotating around the axis L2 of the second coil spring 61a. This stabilizes the operation of the second spring seats 62.

The reinforcing components 65 are formed integrally with the first support components 63 and the second support components 64 to link the first support components 63 and the second support components 64. The reinforcing components 65 are plate-shaped members extending in the radial direction, and extend in the rotational direction from the first support components 63 just as do the second support components 64. As shown in FIG. 6, the reinforcing components 65 extend in an arc shape in the rotational direction. A pair of reinforcing components 65 supports the ends of the second coil spring 61a in the axial direction. More precisely, the base portions of the reinforcing components 65 around the first support components 63 come into contact with the ends of the second coil spring 61a in the axial direction.

As seen in FIG. 3, the reinforcing components 65 protrude from the second support components 64 to the opposite side from the second coil spring 61a in the axial direction. The reinforcing components 65 on the engine side are disposed in second openings 24c formed in the second support components 24a, and protrude more to the engine side than the second support components 24a. The reinforcing components 65 on the transmission side are disposed in second openings 24d formed in the second support components 24b, and protrude more to the transmission side than the second support components 24b.

The overall stiffness of the second spring seats 62 is increased by the reinforcing components 65. This suppresses the elastic deformation of the second support components 64 to the outside in the radial direction by centrifugal force.

As shown in FIGS. 6, 7A, and 7B, the reinforcing plates 66 are embedded in the first support components 63 and the second support components 64 to increase further the stiffness of the second spring seats 62. More specifically, as shown in FIG. 7, the reinforcing plates 66 each have a first portion 66a provided to the first support component 63, and second portion 66b provided to the second support component 64. The first portions 66a indirectly support the ends of the second coil springs 61a in the rotational direction. The second portions 66b indirectly support the ends of the second coil springs 61a in the radial direction.

The first portions 66a each have a first hole 66c, a second hole 66d, and a third hole 66e. The first support component main bodies 63a each have a first hole 63e and a second hole 63f. The first holes 66c are disposed at locations corresponding to the first holes 63e, and the second holes 66d are disposed at locations corresponding to the second holes 63f. The third holes 66e are disposed at locations corresponding to the first support protrusions 63b. The first holes 66c and the second holes 66d are used mainly to position the reinforcing plates 66 during injection molding.

The second portions 66b are portions that protrude to the outside in the radial direction from the first portions 66a, and that are bent in the rotational direction. As shown in FIGS. 7A and 7B, the second portions 66b are in the form of arcs that conform to the outer periphery of the second coil springs 61a. The width of the second portions 66b in the axial direction is less than the width of the first portions 66a in the axial direction. The second portions 66b are embedded in the second support components 64 to be partly exposed, and to have sliding surfaces 66f that face inward in the radial direction. The sliding surfaces 66f and the inner peripheral faces 64d of the second support components 64 form curved surfaces that conform to the outer periphery of the second coil springs 61a. The sliding surfaces 66f come into contact with the ends of the second coil springs 61a in the radial direction. The second portions 66b restrict the movement of the second coil springs 61a to the outside in the radial direction.

Since the metal reinforcing plates 66 are thus embedded in the first support components 63 and the second support components 64, the stiffness of the second spring seats 62 is even higher.

Operation

The operation of the damper disk assembly 1 will now be described initially with reference to FIGS. 1-4.

When torque is inputted from the crankshaft to the input plate 2, the input plate 2 rotates relative to the hub 3. As a result, the first spring assemblies 5, the second spring assemblies 6, and the third coil springs 7 begin to compress, in that order. More specifically, just the first coil springs 51 are compressed in the rotational direction up to a specific torsional angle. When the input plate 2 rotates relative to the hub 3 beyond the specific torsional angle, the second coil springs 61a and the fourth coil springs 61b are compressed. When the input plate 2 rotates farther still relative to the hub 3, the third coil springs 7 are compressed in the rotational direction in addition to the first coil springs 51, the second coil springs 61a and the fourth coil springs 61b. Thus, torsional characteristics having three stages of torsional stiffness can be obtained with this damper disk assembly 1.

Also, a gap is ensured between the stoppers 83b and the holes 37 in the rotational direction. Therefore, when tiny torsional vibrations are inputted to the damper disk assembly 1, for example, the large friction generating mechanism 8a does not operate, and only the small friction generating mechanism 8b operates. As a result, tiny torsional vibrations brought about by combustion fluctuations in the engine are effectively absorbed and dampened.

The operation of the second spring assemblies 6 will now be described. When the damper disk assembly 1 rotates, the second spring assemblies 6 are subjected to centrifugal force. The second coil springs 61a and the fourth coil springs 61b are supported by the second spring seats 62 in the radial direction. Therefore, a load to the outside in the radial direction corresponding to the weight and rotational speed of the second coil springs 61a and the fourth coil springs 61b acts on the second spring seats 62. More specifically, as shown in FIG. 6, a load F acts on the second support components 64 (the base portions on the first support component 63 side of the second support components 64) from the ends of the second coil springs 61a.

At this point, the overall stiffness of the second spring seats 62 is increased by the reinforcing components 65 and the reinforcing plates 66, so there is less elastic deformation of the second support components 64 to the outside in the radial direction. This reduces the generation of high frictional resistance between the second support components 64 and the second support components 24a and 24b, or between the second support components 64 and the end faces 34a of the second windows 34, so there is less wear of the second spring seats 62.

Effects

The effects obtained with the first spring seats 52, the second spring seats 62, and the damper disk assembly 1 are as follows.

(1) With the second spring seats 62, the reinforcing components 65 extending in the radial direction link the first support components 63 and the second support components 64. Therefore, the overall stiffness of the second spring seats 62 can be higher than with conventional seats. As a result, there is less sliding between the second support components 64 and the input plate 2, or between the second support components 64 and the hub 3, and the ability of the damper disk assembly 1 to absorb and to dampen torsional vibrations can be improved.

Since there is less sliding between the second spring seats 62 and other members, there is also less wear of the second spring seats 62. Furthermore, even if the second spring seats 62 do wear, there will be less decrease in the overall stiffness of the second spring seats 62. That is, durability is enhanced with the second spring seats 62.

The same effects are obtained with the first spring seats 52.

(2) There are cases, for example, when, during the operation of the damper disk assembly 1, the first support components 53 of the first spring seats 52 may collide with the input plate 2 and the hub 3 in the rotational direction, or the first support components 53 may collide with the first coil springs 51 in the rotational direction.

However, since the first spring seats 52 are made of plastic, a collision between the first spring seats 52 and surrounding members does not make as much noise.

Also, there are cases, for example, when, during the operation of the damper disk assembly 1, the first support components 63 of the second spring seats 62 may collide with the input plate 2 and the hub 3 in the rotational direction, or the first support components 63 may collide with the second coil springs 61a in the rotational direction.

However, since the first support components 63 are covered by a plastic portion, a collision between the second spring seats 62 and surrounding members does not make as much noise.

(3) With a conventional spring seat, if the thickness of the sliding components is increased to raise the stiffness of the sliding components disposed to the outside of the spring in the radial direction, then the size of the surrounding members must be changed.

With the second spring seats 62, however, the reinforcing components 65 are disposed within the second openings 24c and 24d. Therefore, the thickness of the reinforcing components 65 can be increased without changing the size of the various components of the first plate 21 and the second plate 22. As a result, the stiffness of the second spring seats 62 can be increased more easily than with a conventional spring seat.

The same effects are obtained with the first spring seats 52.

(4) With the second spring seats 62, the pair of reinforcing components 65 support the ends of the second coil springs 61a in the axial direction. Therefore, the overall stiffness of the second spring seats 62 can be increased while the operation of the second spring seats 62 is stabilized.

The same effects are obtained with the first spring seats 52.

(5) With the second spring seats 62, the protruding components 64b are formed on the second support components 64. Therefore, the stiffness of the second support components 64 in the radial direction is further increased. That is, the stiffness of the second spring seats 62 can be further increased.

Also, the protruding components 63d are formed on the first support components 63 of the 61. Therefore, the stiffness of the linked portions of the first support components 63 and the second support components 64 can be further increased.

As discussed above, the stiffness of the second spring seats 62 is further increased by the protruding components 64b and 63d.

The same effects are obtained with the first spring seats 52.

(6) With the second spring seats 62, the second support protrusions 63c and the protruding components 64b and 63d are disposed between the base portions of the second support components 24a and 24b in the axial direction. Therefore, the second support protrusions 63c and the protruding components 64b and 63d prevent the second spring seats 62 from rotating around the axis L2 of the second coil springs 61a relative to the input plate 2. This stabilizes the operation of the second spring seats 62.

The same effects are obtained with the first spring seats 52.

(7) With the second spring seats 62, the reinforcing plates 66 are embedded in the first support components 63 and the second support components 64. Therefore, the overall stiffness of the second spring seats 62 is further increased compared to the overall stiffness of the first spring seats 52.

(8) With the first spring seats 52, the ends of the metal first coil springs 51 are pushed by centrifugal force against the plastic second support components 54. Therefore, there is the risk that the inner peripheral faces of the second support components 54 will be deformed or worn down.

However, with the second spring seats 62, the sliding surfaces 66*f* of the metal reinforcing plates 66 come into contact with the metal second coil springs 61*a* in the radial direction. Therefore, the ends of the second coil springs 61*a* are not pressed as much against the inner peripheral faces 64*d* of the second support components 64, and deformation and wear of the second support components 64 can be prevented.

Also, since the reinforcing plates 66 and the second coil springs 61*a* are both made of metal, neither of the reinforcing plates 66 or the second coil springs 61*a* becomes much more worn than the other. In addition, since the second spring seats 62 move in the rotational direction along with the ends of the second coil springs 61*a*, the ends of the second coil springs 61*a* do not slide as much over the reinforcing plates 66. That is, wear of the reinforcing plates 66 can be suppressed.

As discussed above, since the sliding surfaces 66*f* of the reinforcing plates 66 come into contact with the ends of the second coil springs 61*a* in the radial direction, the plastic portion of the second support components 64 can be protected, and wear of the second spring seats 62 can be suppressed.

(9) With the second spring seats 62, since the ends of the fourth coil springs 61*b* are supported by the first support protrusions 63*b*, the fourth coil springs 61*b* can be prevented from being moved to the outside in the radial direction by centrifugal force. This prevents the fourth coil springs 61*b* from interfering with the second coil springs 61*a*, and improves the ability of the damper disk assembly 1 to absorb and dampen torsional vibration.

(10) As discussed above, with the damper disk assembly 1, there is less sliding of the first spring seats 52 and the second spring seats 62 over the input plate 2 and the hub 3. This improves the ability of the damper disk assembly 1 to absorb and to dampen torsional vibration. Also, with this damper disk assembly 1, durability is improved because the first spring seats 52 and the second spring seats 62 are used.

Alternated Embodiments

Alternate embodiments will now be explained. In view of the similarity between the first and alternate embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The specific constitution of the present invention is not limited to the embodiments given above, and various modifications and changes are possible without departing from the gist of the present invention.

(1) The configuration of the second spring seats 62 is not limited to the above embodiments. A modification example of the second spring seats 62 will be given here. FIGS. 8A and 8B are an elevational view and a cross-sectional view of second spring seats 162. The cross section in FIG. 8B is taken along the line C-C in the elevational view of FIG. 8A. As stated, components that are the same as those in the above embodiment are numbered the same and may not be described again.

As shown in FIGS. 8A and 8B, reinforcing plates 166 are embedded in the first support components 63 and the second support components 64. The reinforcing plates 166 each have a first portion 166*a* provided inside the first support component 63, a second portion 166*b* provided inside the second support component 64, and a pair of third portions 166*f* provided mainly inside the reinforcing component 65.

The first portions 166*a* and the second portions 166*b* have substantially the same shape as the first portions 66*a* and the second portions 66*b* of the previously described embodiment, so the first portions 166*a* and the second portions 166*b* will not be described in detail here.

The third portions 166*f* each have a support component 166*g* extending in the axial direction from the first portion 166*a*, and a distal end component 166*h* extending in the rotational direction from the support component 166*g*. The distal end components 166*h* are provided in the reinforcing components 65, and extend in an arc shape in the rotational direction, just as the reinforcing components 65 do. The distal end components 166*h* extend to near the center of the reinforcing components 65 in the rotational direction.

Since the stiffness of the reinforcing components 65 is thus increased by the distal end components 166*h* of the reinforcing plates 166, the overall stiffness of the second spring seats 162 is further increased. This further enhances the durability of the second spring seats 162.

(2) In the above embodiments, the second portions 66*b* and 166*b* of the reinforcing plates 66 and 166 were exposed. However, the effect of increasing the overall stiffness of the second spring seats 62 will be obtained even when the second portions 66*b* and 166*b* are completely embedded in the second support components 64.

Also, as long as the overall stiffness of the second spring seats 62 is higher, part of the first portions 66*a* and 166*a* of the reinforcing plates 66 and 166 may also be exposed.

(3) The shape of the reinforcing plates 66 and 166 is not limited to the above embodiments. For example, in the above embodiments, the width of the second portions 66*b* of the reinforcing plates 66 was less than the width of the first portions 66*a*, but the width of the second portions 66*b* may be the same as the width of the first portions 66*a*, or may be greater than the width of the first portions 66*a*.

(4) The configuration of the reinforcing components 55 and 65 is not limited to the above embodiments. For example, the overall stiffness of the first spring seats 52 can be increased even though the reinforcing components 55 are provided on only one side in the axial direction. And the overall stiffness of the second spring seats 62 can be increased even though the reinforcing components 65 are provided on only one side in the axial direction.

(5) The configuration of the damper disk assembly 1 is not limited to the above embodiments.

(6) In the above embodiments, the damper disk assembly 1 was fixed to the flywheel 10, but the damper disk assembly 1 can be applied to any apparatus that absorbs and dampens torsional vibrations. For example, the damper disk assembly 1 may be used in a clutch disk assembly or in a dual mass flywheel.

(7) In the above embodiments, the first spring seats 52 were made of plastic, but the material of the first spring seats 52 is not limited to this. For example, the first spring seats 52 may be made of metal or the like.

Figure 9:
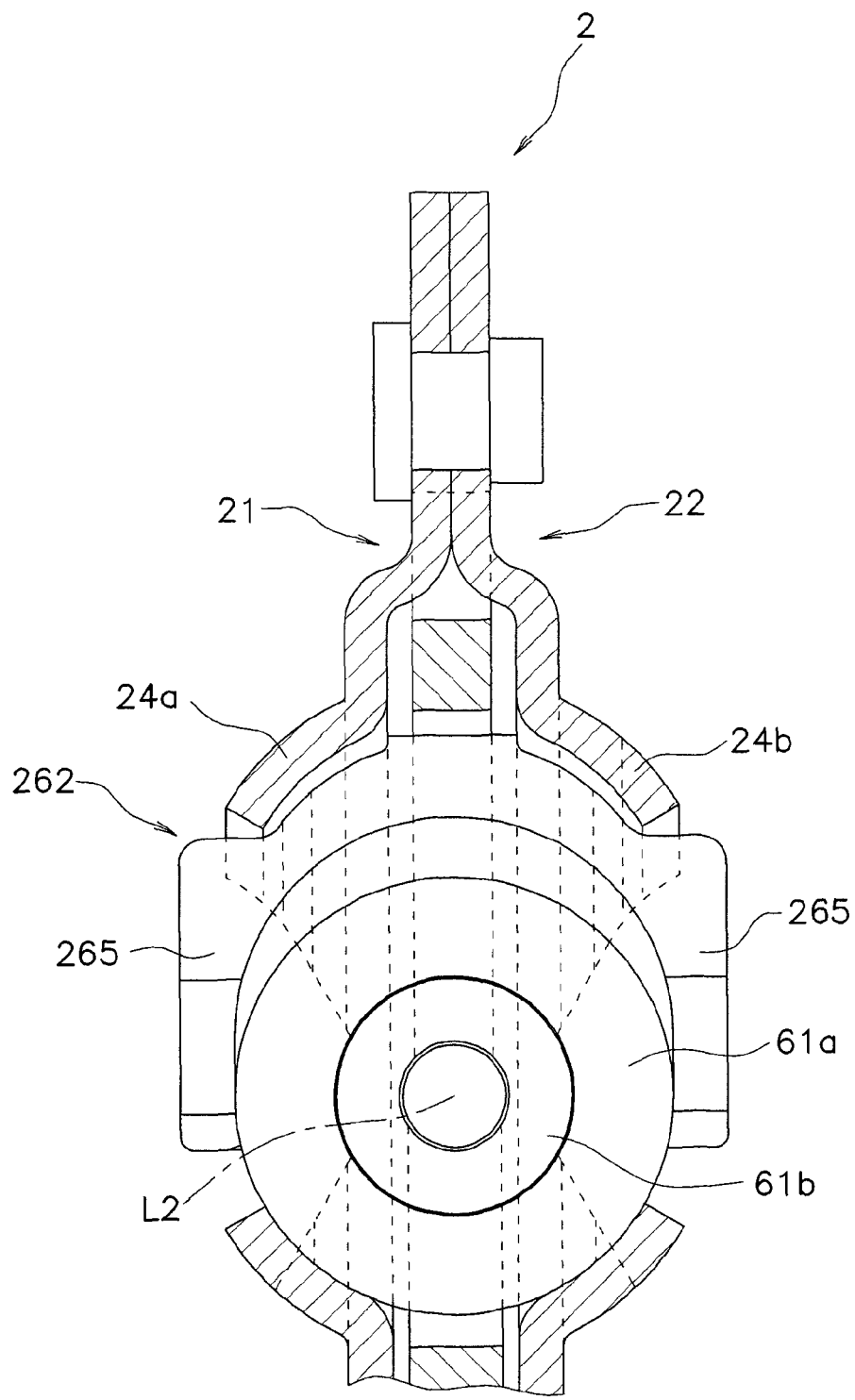
FIG. 9 is a simplified vertical cross-sectional view of the area around a second spring seat in accordance with another alternate embodiment of the present invention.

(8) In the above embodiments, the reinforcing components 65 of the second spring seats 62 were not in contact with the second support components 24a and 24b in the radial direction, but it is also possible to utilize the reinforcing components 65 to prevent the rotation of the second spring seats 62. For example, as shown in FIG. 9, second spring seats 262 have reinforcing components 265. The reinforcing components 265 are longer in the radial direction than the length of the reinforcing components 65 in the radial direction. Therefore, the reinforcing components 265 are closer to the second support components 24a and 24b than in the above embodiments.

In this case, since the reinforcing components 265 are longer in the radial direction than the reinforcing components 65, the overall stiffness of the second spring seats 262 is even higher. In addition, when the second spring seats 262 rotate, the reinforcing components 265 come into contact with the second support components 24a and 24b, so the overall stiffness of the second spring seats 262 is further increased, while the operation of the second spring seats 262 is stabilized.

The same effects are obtained with the first spring seats 52.

GENERAL INTERPRETATION OF TERMS

In understanding the scope of the present invention, the term "configured" as used herein to describe a component, section or part of a device that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a damper disk assembly equipped with the present invention. Accordingly, these terms, as utilized to describe the present invention should be interpreted relative to a damper disk assembly equipped with the present invention as normally used. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spring seat supporting a spring being configured to absorb and to dampen torsional vibrations, comprising:
   a plastic first support component supporting an end of the spring in an axial direction of the spring;
   a plastic second support component extending in the axial direction from the first support component, and supporting the end of the spring in a first direction perpendicular to the axial direction;
   a metal reinforcing plate being at least partially embedded in the first and second support component, and supporting the end of the spring along with the first and second support components; and
   a reinforcing component that is formed integrally with the first and second support components to link the first and second support components, and that extends in the first direction from the second support component,
   the reinforcing plate further having at least one third portion that extends in the axial direction from the first portion, and that is embedded in the reinforcing component.

2. The spring seat according to claim 1, wherein
   the reinforcing plate has a first portion that supports the end of the spring in the axial direction, and a second portion that extends in the axial direction from the first portion and supports the end of the spring.

3. The spring seat according to claim 2, wherein
   the first portion is embedded in the first support component, and
   at least part of the second portion is exposed from the second support component configured to contact the end of the spring.

4. The spring seat according to claim 3, wherein
   the first support component has a first support component main body that contacts the end of a first spring in the axial direction, and a first support protrusion that protrudes from the first support component main body to a first spring side, and
   the first support protrusion is fitted to the end of the first spring or to the end of a second spring that is disposed on the inner peripheral side of the first spring and has an outside diameter that is smaller than the inside diameter of the first spring.

5. The spring seat according to claim 1, wherein
   the first support component has a first support component main body that contacts the end of a first spring in the axial direction, and a first support protrusion that protrudes from the first support component main body to a first spring side, and
   the first support protrusion is fitted to the end of the first spring or to the end of a second spring that is disposed on the inner peripheral side of the first spring and has an outside diameter that is smaller than the inside diameter of the first spring.

6. A damper disk assembly, comprising:
   an input rotor;
   an output rotor being disposed rotatably with respect to the input rotor;
   at least one spring disposed to be compressible in the rotational direction between the input and output rotors; and
   a pair of the spring seats being mounted at the ends of the spring, each spring seat having
      a plastic first support component supporting an end of the spring in an axial direction of the spring,
      a plastic second support component extending in the axial direction from the first support component, and supporting the end of the spring in a first direction perpendicular to the axial direction,
      a metal reinforcing plate being at least partially embedded in the first and second support component, and supporting the end of the spring along with the first and second support components, and a reinforcing component that is formed integrally with the first and second support components to link the first and second support components, and that extends in the first direction from the second support component, the reinforcing plate further having at least one third portion that extends in the axial direction from the first portion, and that is embedded in the reinforcing component.

7. The damper disk assembly according to claim 6, wherein the reinforcing plate has a first portion that supports the end of the spring in the axial direction, and a second portion that extends in the axial direction from the first portion and supports the end of the spring.

8. The damper disk assembly according to claim 7, wherein the first portion is embedded in the first support component, and at least part of the second portion is exposed from the second support component configured to contact the end of the spring.

9. The damper disk assembly according to claim 8, wherein the first support component has a first support component main body that contacts the end of a first spring in the axial direction, and a first support protrusion that protrudes from the first support component main body to a first spring side, and the first support protrusion is fitted to the end of the first spring or to the end of a second spring that is disposed on the inner peripheral side of the first spring and has an outside diameter that is smaller than the inside diameter of the first spring.

10. The damper disk assembly according to claim 6, wherein the first support component has a first support component main body that contacts the end of a first spring in the axial direction, and a first support protrusion that protrudes from the first support component main body to a first spring side, and the first support protrusion is fitted to the end of the first spring or to the end of a second spring that is disposed on the inner peripheral side of the first spring and has an outside diameter that is smaller than the inside diameter of the first spring.

* * * * *

UNITED STATES PATENT AND TRADEMARK OFFICE
CERTIFICATE OF CORRECTION

| | |
|---|---|
| PATENT NO. | : 8,029,370 B2 |
| APPLICATION NO. | : 12/057920 |
| DATED | : October 4, 2011 |
| INVENTOR(S) | : Akihiko Oono et al. |

Page 1 of 1

It is certified that error appears in the above-identified patent and that said Letters Patent is hereby corrected as shown below:

On the title page change the listing of [73] from

"[73]    Assignee:    Exedy Corporation, Osaka (JP)"

to

-- [73]    Assignee:    Nissan Motor Co., Ltd., Yokohama-shi (JP); Exedy Corporation, Osaka (JP) --

Signed and Sealed this
Twenty-fourth Day of April, 2012

David J. Kappos
*Director of the United States Patent and Trademark Office*